United States Patent [19]

Staudenrausch et al.

[11] Patent Number: 4,547,931
[45] Date of Patent: Oct. 22, 1985

[54] APPARATUS FOR AUTOMATIC DELIVERY FROM A RECEIVER OF ADJACENTLY HANGING LOOPS OF SAUSAGES

[75] Inventors: Georg Staudenrausch, Biberach; Franz Abt, Schemmerhofen; Manfred Kern, Ummendorf; Georg Zinser, Winterstettenstadt, all of Fed. Rep. of Germany

[73] Assignee: Albert Handtmann Maschinenfabrik GmbH & Co., KG, Biberach, Fed. Rep. of Germany

[21] Appl. No.: 538,782

[22] Filed: Oct. 4, 1983

[30] Foreign Application Priority Data

Oct. 13, 1982 [DE] Fed. Rep. of Germany ....... 3238023

[51] Int. Cl.⁴ ........................................... A22C 15/00
[52] U.S. Cl. ......................................... 17/1 F; 17/33; 17/44.4
[58] Field of Search ...................... 17/44.4, 1 F, 33, 34

[56] References Cited

U.S. PATENT DOCUMENTS

| | | | |
|---|---|---|---|
| 2,674,004 | 4/1954 | Cross | 17/34 |
| 2,697,850 | 12/1954 | Cross | 17/34 |
| 4,091,505 | 5/1978 | Müller | 17/1 F X |
| 4,339,846 | 7/1982 | Zamiara | 17/44.4 X |

Primary Examiner—Willie G. Abercrombie
Attorney, Agent, or Firm—James E. Nilles

[57] ABSTRACT

Apparatus for automatic continuous or stepwise delivery of sausage loops hanging adjacent to one another from a receiver under which a smoking rod is arranged that is slidable in the feed direction of the receiver relative thereto.

9 Claims, 3 Drawing Figures

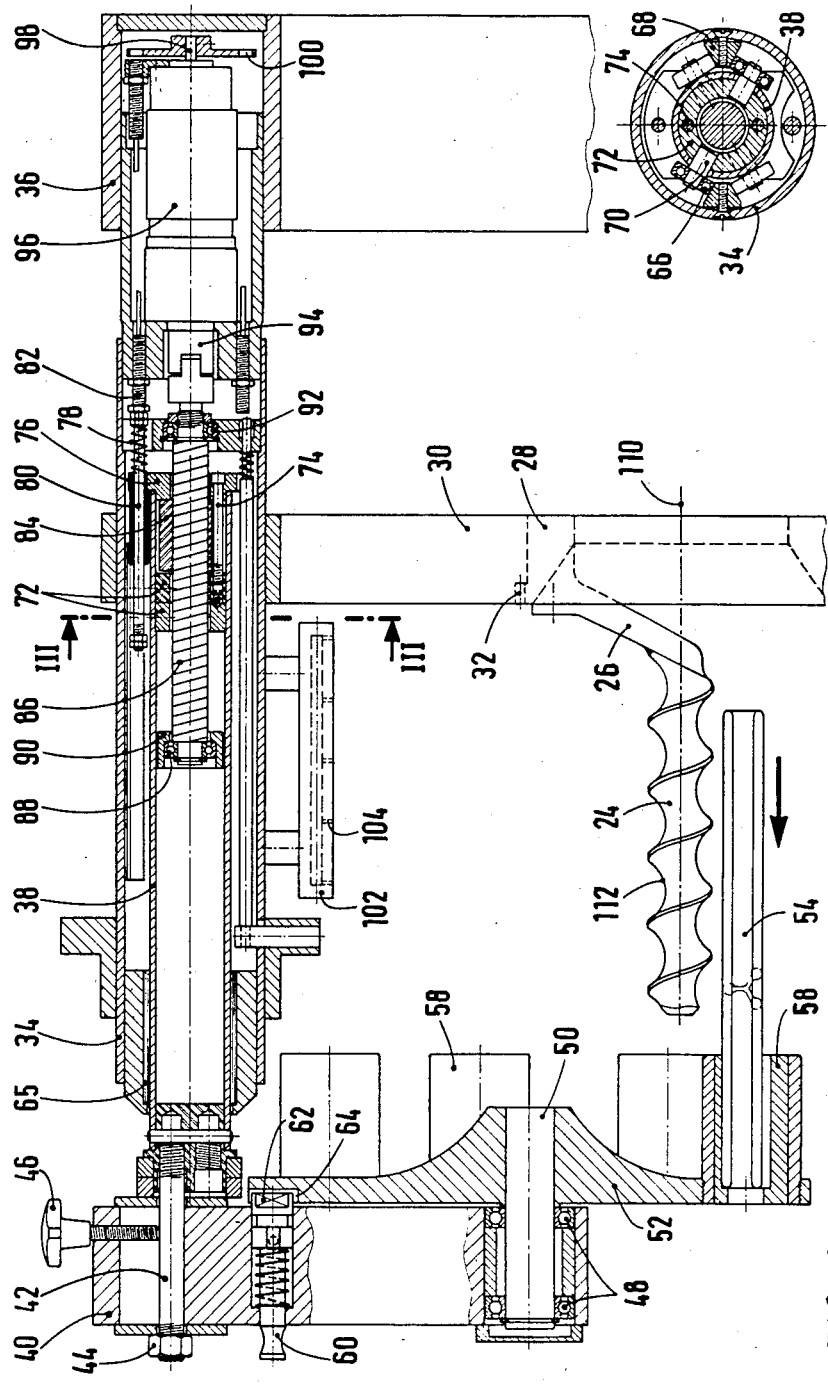

APPARATUS FOR AUTOMATIC DELIVERY FROM A RECEIVER OF ADJACENTLY HANGING LOOPS OF SAUSAGES

The invention relates to an apparatus for automatic continuous or stepwise delivery of adjacently hanging sausage loops from a receiver.

From German published patent application No. 26 19 296 and from U.S. Pat. No. 3,191,222 there have become known devices for hanging and feeding sausages that comprise an endless circulating conveyor for the sausage loops which are lifted up by hand onto a smoking rod.

The subject matter of U.S. Pat. No. 3,533,495 is an apparatus for automatic transfer of sausage loops from a receiver to a smoking rod. The receiver is in this case formed as an endlessly circulating chain that is provided with hooks on which the sausage loops hang. The transfer of the sausage loops from the hooks to the smoking rod is therein accomplished in such a manner that when the chain is stopped, and in some cases also when it is running, the smoking rod is so moved relative to the chain that the sausage loops are stripped off of the hooks. The distances between the sausage loops on the smoking rod correspond to the distances between the hooks on the chain. In stripping the sausage loops from the hooks there exists the danger that the relatively delicate sausage casings will be damaged or destroyed and that the sausage loops will no longer hang at uniform intervals along the smoking rod.

In an apparatus that has become known through U.S. Pat. No. 3,115,668, the sausages hanging adjacent to one another slide, in their connection with a portioning and twisting-off device, onto a rotatable smoking rod that stands at an angle to its axis of rotation and has at its free end a head that holds the sausages on the smoking rod. In this case the smoking rod is held loosely in a rotatable disc, from which it can be removed by hand as soon as the desired number of closely spaced sausage loops has been reached.

The subject matter of German Pat. No. 26 10 315 is an apparatus for hanging up sausages, with a rotatable rod-like receiver that has one of its ends formed as a receiver arm. This lies in the zone of exit of the sausages from a feed device and forms an angle with the receiver arm. For uniform distribution of the sausages over the length of the receiver, the latter can be coupled with a belt conveyor that has conveyor fingers which engage between the sausages.

In this known apparatus for hanging up sausages the sausage loops are generally so removed from the spiral shaft that the smoking rod, as in the case of the devices mentioned in the introduction (German Published Application No. 26 19 296, U.S. Pat. No. 3,191,222), is pushed between the sausage loops and is then lifted so high that the sausages come to lie upon the smoking rod at their turned off points. Then the smoking rod, with the sausages, is separated from the spiral shaft in the axial direction. This type of transfer fails, however, when the sausages hang in pairs on the spiral shaft, because, owing to the comparatively large outside diameter of the spiral shaft, they cannot be removed in the axial direction.

Finally, in German Published Application No. 32 06 956 there is described and illustrated a stuffing machine and receiver device for portioned sausage chains, wherein the adjacent sausages hanging in loops are removed from a table by conveyor belts and are delivered to a stuffing arm that rotates in a circle around a smoking rod. In this a wire basket elbow lays longer or shorter loops, according to the velocity of the belt, upon a smoking rod arranged beneath it, which meanwhile slides horizontally. As soon as a smoking rod is loaded, it is processed on a diagonal guide bar by means of a deflection mechanism. In connection therewith, an empty smoking rod is inserted into a rod holder and is transported back to the loading position. This means that dead times exist during the processing of a loaded smoking rod and its exchange for an empty smoking rod, and they can not be used for a subsequent loading procedure.

Going forward from the subject matter of German Pat. No. 26 10 315, this invention has as its object to improve this known apparatus so that the receiver functions as a buffer from which the sausage loops can be delivered to a smoking rod without dead time and as gently as possible.

In the apparatus of the class outlined in the introduction, this object is achieved according to the invention in that a smoking rod is arranged closely under the receiver that is movable relative to the receiver in its feeding direction.

The sausage links fall according to the feeding advances of the receiver at its delivery end onto the smoking rod arranged therebeneath, which draws back stepwise or continuously from the working zone of the receiver. Thereby a desired distance is maintained between the sausage loops on the smoking rod. Meanwhile the sausages remain undamaged because a raising of the smoking rod for lifting the sausages off of the receiver or an encircling of the smoking rod by a wire basket elbow is not required. Inasmuch as a smoking rod is arranged in relation to the receiver, the receiver serves as a buffer upon which new loops of sausage can be hung during the exchange of a full smoking rod for an empty smoking rod and during the subsequent insertion of the empty smoking rod under the receiver, so that there are no dead times.

Preferably the smoking rod moves parallel to the receiver.

In further development of the invention it is foreseen that the smoking rod is movable in steps that are matched to the feed steps of the sausage loops onto the receiver or in particular cases are equal to that feed. The distance between the sausage loops on the smoking rod can thus be predetermined within wide limits by selection of the displacement speed or the step lengths of the smoking rod.

The regulation can suitably be accomplished as a function of the number of sausage loops produced in the preceding cycle. The step length of the smoking rod from rod to rod can be automatically so selected that the sausage loops which are on the receiver are uniformly distributed on the smoking rod.

According to a further feature of the invention, a plurality of smoking rods stand out from a smoking rod drum that is rotatable about its central axis, which extends parallel to the smoking rods, in steps that correspond to the angle between the smoking rods.

Preferably the smoking rod drum is in this case held on an axially movable actuating pipe, the longitudinal axis of which extends parallel to the smoking rods.

The smoking rod drum is in this case removably secured to the actuating pipe.

With this embodiment of the invention it is possible to immediately hang sausage loops on a specified number of smoking rods, so that the service person only needs to take off the loaded smoking rods and hang them in a smokehouse. Meanwhile, an empty smoking rod drum can be fastened to the actuating pipe, so that no dead times, or only very short ones, occur.

However, it is also possible to transport the loaded smoking rods individually to the smoke house. The smoking rod holders in the smoking rod drum then serve as a magazine for loaded and unloaded smoking rods. The spiral shaft of the receiver can extend continuously therethrough. An especially gentle handling is obtained if the receiver is a rotatable spiral shaft, such as is known from the above mentioned German Pat. No. 26 10 315.

In order to prevent the sausages from turning with the spiral shaft, there is provided a device associated with the receiver for moistening the sausages that are sliding on the receiver.

The invention is explained in the following with reference to an exemplary embodiment that is illustrated in the drawings, wherein:

FIG. 2 is an enlarged sectional view of the apparatus according to the invention; and FIG. 3 is a sectional view on the plane III—III of FIG. 2.

Figure 1:
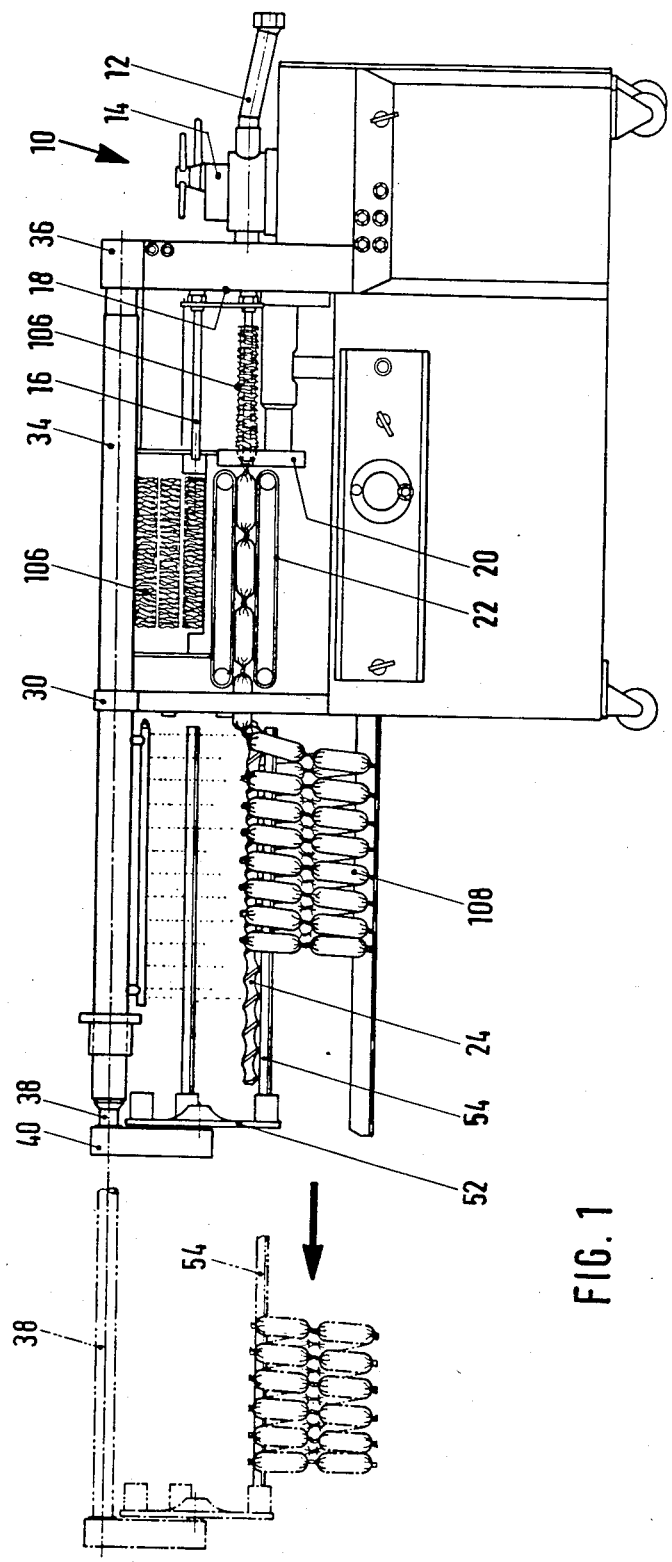
FIG. 1 is an elevation of an apparatus for portioning and twisting off sausages, with the associated apparatus built according to the invention for automatically transferring the sausage loops to the smoking rod.

FIG. 1 schematically shows in its right-hand portion a sausage manufacturing machine 10 which is connected by means of a duct 12 with a filling pump (not shown) for the sausage stuffing. Through a metering pump 14 the sausage stuffing arrives at a twist-off spout 16 that is in an operating condition. This is fastened to a rotating head 18 along with other twist-off spouts. A twist-off device 20 serves to neck down the filled sausage casing closely behind the free end of the twist-off spout 16. By means of a conveyor device 22 the adjacently connected sausages arrive at a receiver 24 that is formed as a spiral shaft.

In the manner described in German Pat. No. 26 10 315, the receiver 24 is fastened by means of an oblique receiver arm 26 to a shell ring 28 that is rotatably carried in a support 30. For rotational drive, the shell ring 28 has an outer gear ring 32 that meshes with a drive pinion which is not shown.

To the sausage making machine 10 there is secured a supporting pipe 34, which is supported at one end in a bearing block 36 and at its middle portion by the support 30. A slide pipe 38 is axially movably supported in the supporting pipe 34, and on its end that projects out of the supporting pipe 34 a support arm 40 is fastened. For this a bolt 42 is screwed into the closed free end of the slide pipe 38, which takes up the support arm 40. For taking the support arm 40 off of the bolt 42 it is sufficient to unscrew a nut 44 from the free threaded end of the bolt 42.

To the lower end of the support arm 40 the axle 50 of a disc-like smoking rod drum 52 is rotatably fastened by means of a roller bearing 48. From this smoking rod drum 52 project seven smoking rods 54 that are arranged at uniform intervals around its circumference and extend parallel to the longitudinal axis of the receiver 24. Each smoking rod 54 can have various forms in cross-section, for example, the form of a three-toothed star, and is secured in a receiving shell 58 of the smoking rod drum 52.

For arresting the smoking rod drum 52 there is provided in the support arm 40 a stop bolt 60 that engages with its coupling end 62 in suitable recesses 64 in the smoking rod drum 52. The recesses 64 are in this case so arranged on the periphery of the smoking rod drum 52 that in each arrested position of the smoking rod drum 52 a smoking rod 54 lies exactly vertically underneath the receiver 24.

The stop bolt 60 is so formed that the smoking rod drum 52 can only be turned in one direction. By turning the stop bolt 60 through 180°, the direction of rotation of the smoking rod drum 52 can be reversed. Thereby the removal of loaded smoking rods from the front or from the back side of the machine is possible.

Serving to guide the slide pipe 38 in the supporting pipe 34 is a ball guide bushing 65 on the open end of the supporting pipe 34 as well as four radial ball bearings 66, shown in FIG. 3, which are supported in pairs by two oppositely disposed guide rails 68 that are secured to the inner wall of the supporting pipe 34 and extend in its longitudinal direction. Each of two diametrically opposite radial roller bearings 66 is fastened by means of associated pivot pins 70 in a support ring 72 that is seated in the slide pipe 38. The two support rings 72 can be so adjusted and fixed relative to one another that the radial guidance of the slide pipe is almost without play. By means of two tie rods 74 the flange ring 76 is drawn against the end of the slide pipe.

A bolt 80 serves as a circuit element for the induction switch 82 by which the stopping of the inward motion of the slide pipe 38 is initiated. The deceleration movement of the bolt 80 is taken up by the spring 78.

Between the flange ring 76 and the support ring 72 that lies axially opposite it a nut 84 is floatingly supported. This nut 84 is screwed onto a threaded shaft 86 with a trapezoidal thread, which shaft has its end proximal to the ball guide bushing 65 radially supported in the slide pipe 38 by a roller bearing 88 and a slide ring 90. The opposite end of the threaded shaft 86 is rotatably supported in the supporting pipe 34 by means of a radial bearing 92.

The threaded shaft 86 is connected by means of a jaw clutch 94 with the driving shaft of a drive motor 96 that is secured in the bearing block 36. Upon the projecting rear end 98 of the shaft of the drive motor 96 there is secured a disc-shaped impulse transmitter 100 that provides a motor shaft rotation measurement in a known manner.

It has been found advantageous in some cases to have the drive motor 96 run in steps, each time at maximum rotational speed during motion of the smoking rod 54 into the sausage loops, but on the other hand run at a lower but constant rotational speed when it rides out. The step lengths can be held constant by means of a coasting corrector.

Over the receiver 24, on the under side of the supporting pipe 34, there is fastened a device 102 with downwardly directed spray nozzles 104.

After the machine 10 is switched on, a length of gut casing 106 is pushed onto the upper twist-off spout 16 shown in FIG. 1, by means of a device that is not illustrated, upon which the rotating head 18 swings this twist-off spout 16 to the working position shown in FIG. 1. At the same time the smoking rod drum 52 is moved in the direction opposite to the arrows shown in FIGS. 1 and 2 by means of the direct-current drive motor 96 into the starting position in which a smoking rod 54 lies exactly vertically under the receiver 24. In this position, as FIG. 1 shows, the smoking rod 54, under the receiver 24 that is formed as a spiral shaft, engages through the sausage loops 108 that hang on it.

As soon as the two above explained movement courses are completed, the machine 10 begins to portion and twist off the sausages, and the receiver 24 that is secured to the shell ring 28 turns about its longitudinal axis 110.

At each rotation of the receiver 24, the receiver arm 26, in the manner described in German Pat. No. 26 10 315, picks up the sausage chain given off from the feed device 22 in the region of a neck between two sausages and so lifts it that this neck, with further rotation of the receiver arm 26, slides along it and off onto the receiver 24. During the further rotation of the receiver 24, the thus picked up sausage loop 108 slides forward in the spiral groove 112 in the receiver, while the feed device 22 gives off a further sausage loop that will be picked off from the receiver arm 26 with the next rotation of the receiver 24. The number of sausages per loop is selectable.

With each rotation of the receiver 24 a sausage loop 108 falls from its free end onto the smoking rod 54 lying thereunder. By the drive motor 96, through the threaded shaft 86, the nut 84 and the slide pipe 38, the support arm 40 and with it the smoking rod drum 52 are thereby likewise moved out in the feed direction, and of course stepwise, so that with each step a further sausage loop 108 falls onto the smoking rod 54. The rotational angle of the drive motor per step length can determine the distances between the sausage loops 108 on the smoking rod 54.

The smoking rod 54 rides forward beneath the receiver 24 until all of the sausage loops 108 that were hanging on the receiver 24 at the beginning of the cycle are hanging, uniformly divided, upon the smoking rod 54. At the end of the casing the portioning of the sausage is also cut off; the receiver 24 however still turns until the first sausage loop 108 of the following sausage chain hangs on the free end of the receiver 24, at the front of the spiral groove 112.

When the last sausage loop 108 is laid off onto the smoking rod 54, the latter rides completely out, so that it can be swung away.

Through the rotation of the smoking rod drum 52 around a section, the next, empty smoking rod 54 comes to the lowest position and can be moved under the receiver 24, oppositely to the indicated direction of feed, and between the sausage loops 108 already hanging there, so that a new operating cycle can begin.

The loaded smoking rod 54 is taken out of the smoking rod drum during the next cycle and is hung in the smoke wagon or in the pass-through smoking installation.

The duration of an operating cycle can be so controlled that, selectably, the sausage loops 108 of one gut casing 106 or of a plurality of gut casings can be hung on one smoking rod 54. Furthermore, the movement of the receiver 24 can be so controlled that the number of sausages in each sausage loop 108 can be two, three, four, six, eight, ten, twelve, sixteen or more. The lengths of the smoking rods are in general so measured that each smoking rod 54 can take up somewhere between 14 and 40 sausage loops 108. Basically, the sausage loops can be formed of any arbitrary number of sausages.

With large numbers of sausages per sausage loop 108 the number of movements of the receiver 24 that is formed as a spiral shaft should not be much larger than the number of sausage loops 108, so that the above mentioned time of subsequent movement of the receiver 24 for advancing the first sausage loop 108 of a chain to the front end of the spiral groove 112 of the receiver 24 is not longer than the time that is necessary to swing the smoking rod drum 52 to a new operating position.

As already mentioned, the sausage loops 108 are always uniformly divided along the whole smoking rod 54 in correspondence with the angle of rotation per step length of the drive motor 96, independently of the number of sausage loops 108. With fewer than fourteen sausage loops 108 per smoking rod 54, they are laid off at such intervals as if fourteen sausage loops 108 had been provided.

During the portioning of the sausages for a smoking rod 54 (from one or more gut casings 106), the rotations of the receiver 24 are counted, in general by an impulse transmitter. Each loop count is thus assigned an impulse count for the displacement travel through which the smoking rod 54 is to be pushed per sausage loop 108 during the delivery of this sausage loop.

In order to avoid the need for switching over the electronic control for different length smoking rods, various impulse transmitters 100 are employed on the drive motor 96 for different length smoking rods, their number of holes, and thus their impulse count, corresponding to the respective smoking rod lengths. In this manner, the travel of the smoking rod 54 per impulse is changed, and thus also the length of smoking rod 54 that is hung with sausage loops.

In order to prevent the sausages from turning with the receiver 24 during its rotation, by reason of friction, they are sprinkled with water by the spray nozzles 104 of the device 102. With the sausages thus moistened, the coefficient of friction between sausages and the receiver 24 is reduced. The water quantity for this purpose can be adjusted by means of a metering control value, not shown.

In principle it is possible to provide some other system instead of a receiver 24 that is formed as a spiral shaft, as for example a receiver that is formed as an endless circulating chain with hooks, or a receiver formed as a smooth bar which cooperates with a strip-off band that has projecting stripping fingers.

Furthermore, it is in principle also possible to have the smoking rod 54 not move in steps, but continuously, and in this case, too, the displacement speed determines the distance between the sausage loops 108 on the smoking rod 54.

What is claimed as the invention is:

1. Apparatus comprising a horizontally elongated receiver having a rear end portion onto which connected, lengthwise adjacent sausages are fed as they are produced, to be supported by the receiver as loops which hang across it and are spaced at intervals along its length, receiver drive means for propelling loops of sausages on the receiver forwardly along the same towards a front end thereof, and means for transferring loops of sausages from the receiver onto a smoking rod upon which the sausages can be carried away from the receiver and by which they can be supported for smoking, wherein the last mentioned means comprises:

A. a smoking rod carrier having a socket in which a front end portion of a smoking rod is readily removably receivable;

B. means mounting said smoking rod carrier for translatory rearward movement to and forward movement away from a home position in which
   (1) said smoking rod carrier is forwardly adjacent to the front end of the receiver and
   (2) a smoking rod in said socket extends rearwardly therefrom substantially parallel to the length of the receiver, vertically beneath the receiver and near the same; and
C. carrier drive means for moving said smoking rod carrier forward from its said home position in synchronism with forward motion of said receiver drive means, so that loops of sausages dropping off of the front end of the receiver and onto a smoking rod in said socket are disposed at regular intervals along that smoking rod.

2. The apparatus of claim 1, further characterized by:
(1) said smoking rod carrier comprising a drumlike member
   (a) which is rotatable about a central axis that extends substantially parallel to the length of the receiver and
   (b) which has a plurality of rearwardly opening sockets therein, in each of which a smoking rod is removably axially receivable to extend substantially parallel to said axis, said sockets being equidistant from said axis and at like distances from one another around said carrier.

3. The apparatus of claim 2, further characterized by:
(2) means for rotatably and axially movably supporting said smoking rod carrier comprising
   (a) a fixed, elongated guide member spaced laterally from the receiver and extending lengthwise parallel to it,
   (b) an elongated slide member guided by said guide member for lengthwise movement relative to it, and
   (c) an arm on a front end of said slide member, projecting laterally therefrom across the front end of the receiver and upon which the smoking rod carrier is rotatably carried.

4. The apparatus of claim 3 wherein said guide member is fixed vertically above the receiver and said arm projects downwardly from the slide member, further characterized by:
   said arm being readily removably secured to the front end of said slide member.

5. The apparatus of claim 1, further characterized by:
(1) said receiver comprising a rotatable shaft that has a longitudinal axis and has a spiral groove extending along its length, and
(2) said receiver drive means providing for rotation of the receiver about its said longitudinal axis in the direction such that loops of sausages resting in said spiral groove are driven forwardly along it.

6. The apparatus of claim 5, further characterized by:
(3) spray means mounted adjacent to the receiver for moistening sausages thereon to facilitate their sliding forwardly along said spiral groove.

7. Apparatus whereby connected lengthwise adjacent sausages are delivered to a smoking rod, comprising a receiver across which the sausages are hung in loops, said receiver having a rear end portion to which the sausages are fed as they are produced and having a front end which is horizontally spaced from said rear end, receiver drive means whereby loops of sausages on the receiver are propelled from said rear end portion thereof to the front end thereof, and means whereby loops of sausages are transferred from the front end of the receiver to the smoking rod and distributed substantially uniformly along the latter so that they can be carried away from the receiver and supported for smoking on the smoking rod, wherein the last mentioned means comprises:
A. a smoking rod carrier having means thereon for removably fastening a smoking rod thereto;
B. means mounting said smoking rod carrier for translatory rearward movement to and forward movement away from a home position in which
   (1) said smoking rod carrier is forwardly adjacent to the front end of the receiver and
   (2) a smoking rod fastened to said carrier extends rearwardly therefrom beneath the receiver and near the same to receive loops of sausages discharged from said front end of the receiver by operation of the receiver drive means; and
C. carrier drive means for moving said smoking rod carrier forward from its said home position at a rate which is selectably variable relative to the rate at which said receiver drive means propels loops of sausages forwardly, so that loops of sausages can be deposited on the smoking rod at intervals therealong that are substantially uniform and are adjustable in dependence upon the length of the smoking rod in relation to the number of sausage loops to be delivered onto it.

8. The apparatus of claim 7 wherein said carrier drive means moves said smoking rod carrier forward from its home position intermittently, so that the smoking rod carrier is advanced through a step each time it is moved, and wherein said rate is selectably varied by changing the distance through which the smoking rod carrier is advanced in each said step.

9. The apparatus of claim 8, further characterized by said carrier drive means comprising a motor and an impulse transmitter rotatably driven by said motor, said impulse transmitter being readily detachably connected with said motor to be interchangeable with a different impulse transmitter to provide for changing said distance through which the smoking rod carrier is advanced in each step.

* * * * *